United States Patent [19]

Nakano et al.

[11] Patent Number: 5,053,889

[45] Date of Patent: Oct. 1, 1991

[54] CHARGE LATENT IMAGE DETECTING DEVICE

[75] Inventors: Atsushi Nakano; Toshio Konno, both of Yokohama; Tadayuki Shimada, Yokosuka, all of Japan

[73] Assignee: Victor Company of Japan, Ltd., Yokohama, Japan

[21] Appl. No.: 530,701

[22] Filed: May 30, 1990

[30] Foreign Application Priority Data

Jun. 15, 1989 [JP] Japan .................................. 1-152852

[51] Int. Cl.$^5$ .......................... H04N 1/04; G02B 5/30; G02F 1/137
[52] U.S. Cl. ..................................... 358/480; 365/108; 359/36; 359/246
[58] Field of Search ............... 358/300, 471, 474, 480, 358/909, 296; 355/210; 346/153.1, 160; 350/393, 384, 388, 390, 391, 331 R, 350 R; 365/108, 112

[56] References Cited

U.S. PATENT DOCUMENTS

| | | | |
|---|---|---|---|
| 4,850,683 | 7/1989 | Kawaguchi | 350/334 |
| 4,888,126 | 12/1989 | Mullen | 350/350 R |

Primary Examiner—Benjamin R. Fuller
Assistant Examiner—Scott A. Rogers
Attorney, Agent, or Firm—Lowe, Price, LeBlanc & Becker

[57] ABSTRACT

A device for detecting a charge latent image on a recording medium includes a photo-modulation member having a composite film of high polymer material and a liquid crystal material dispersed in the high polymer material, preferable liquid crystal material having refraction anisotropy higher than 0.18 and droplet size of less than 0.5 micron.

6 Claims, 2 Drawing Sheets

CHARGE LATENT IMAGE DETECTING DEVICE

BACKGROUND OF THE INVENTION

This invention relates to a device for reading out information represented by a charge latent image formed on a recording medium.

In some information recording and reproducing systems, information is recorded into a recording medium by forming a charge latent image on the recording medium in accordance with the information. The recorded information is reproduced by detecting the charge latent image on the recording medium.

Some charge latent image detecting devices used in such information recording and reproducing systems include a photo-modulation member which is opposed to a recording medium to undergo an electric field dependent upon a charge latent image on the recording medium. During an information reproducing process, light is applied to the photo-modulation member. The applied light is modulated by the photo-modulation member in accordance with the electric field so that the modulated light represents the charge latent image. The modulated light is converted into a corresponding electric signal representing the charge latent image.

A photo-modulation member using a single crystal of lithium niobate has a problem in sensitivity.

In the case of a photo-modulation member using a twisted nematic liquid crystal cell, thick support glass plates are generally required by the cell so that a sensing part of the cell tends to be distant from a recording medium and is thus liable to undergo a weak electric field.

SUMMARY OF THE INVENTION

It is an object of this invention to provide an excellent charge latent image detecting device.

According to a first aspect of this invention, a charge latent image detecting device comprises a photo-modulation member including a complex film, the complex film including high polymer material and liquid crystal, the liquid crystal being dispersed in the high polymer material.

According to a second aspect of this invention, a device for detecting a charge latent image on a recording medium comprises a photo-modulation member having an electrooptic effect, the photo-modulation member opposing the recording medium and being exposed to an electric field dependent on the charge latent image; means for applying a polarized light to the photo-modulation member, wherein the polarized light enters the photo-modulation member, and passes through the photo-modulation member and then exits from the photo-modulation member; means for detecting a polarization of the light which exists from the photo-modulation member; wherein the electrooptic effect of the photo-modulation member varies a polarization of the light in accordance with the electric field applied to the photo-modulation member while the light passes through the photo-modulation member; wherein the photo-modulation member includes a complex film, the complex film including high polymer material and liquid crystal, the liquid crystal being dispersed in the high polymer material.

DESCRIPTION OF THE FIRST PREFERRED EMBODIMENT

Figure 1:
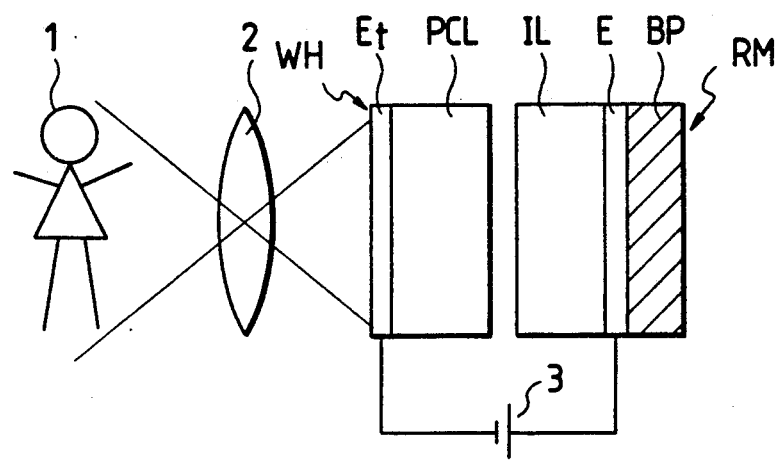
FIG. 1 is a diagram of a recording system.

With reference to FIG. 1, a recording system includes a writing head WH opposing a recording medium RM. The recording medium RM has a laminated structure including a charge holding layer IL, a transparent electrode layer E, and a transparent base plate BP. The electrode layer E is sandwiched between the charge holding layer IL and the base plate BP. The writing head WH has a laminated structure including a transparent electrode layer Et and a photoconductive layer PCL. The photoconductive layer PCL of the writing head WH opposes the charge holding layer IL of the recording medium RM across a minute air gap.

The charge holding layer IL is made of dielectric material having a high insulating resistivity. For example, the charge holding layer IL is composed of a high polymer film.

The positive terminal of a dc power source 3 is electrically connected to the electrode layer E of the recording medium RM. The negative terminal of the power source 3 is electrically connected to the electrode layer Et of the writing head WH. Therefore, an electric field is applied to a region between the electrode layers E and Et which contains the photoconductive layer PCL of the writing head WH and the charge holding layer IL of the recording medium RM.

An optical image of an object 1 is focused by a lens 2 on the photoconductive layer PCL of the writing head WH. Thus, the electric resistance of the photoconductive layer PCL varies with the optical image of the object 1. As a result, a two dimensional distribution of the electric field at the gap between the opposed surfaces of the photoconductive layer PCL and the charge holding layer IL varies in accordance with with the optical image of the object 1. Space discharge takes place across the gap between the photoconductive layer PCL and the charge holding layer IL in response to the electric field so that a charge latent image corresponding to the optical image of the object 1 is formed on the charge holding layer IL of the recording medium RM.

Figure 2:
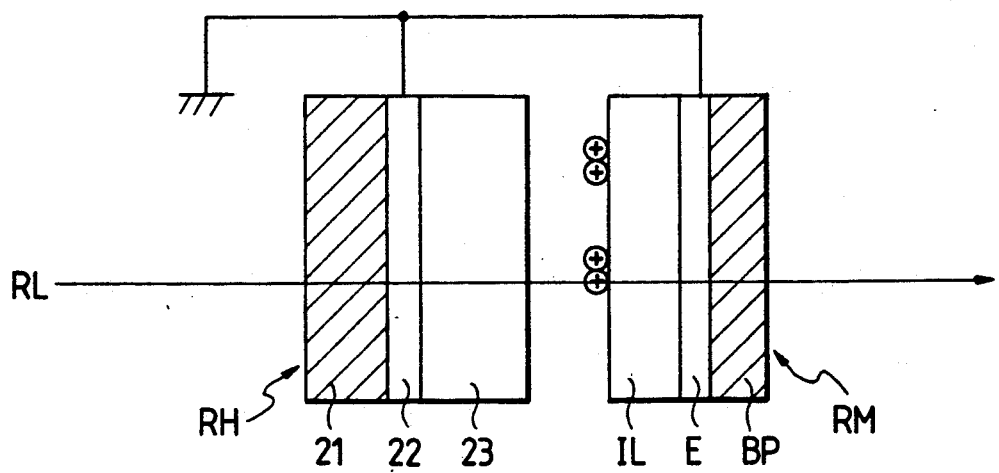
FIG. 2 is a diagram of a charge latent image detecting device according to a first embodiment of this invention.

With reference to FIG. 2, a reading system includes a reading head RH. The reading head RH has a laminated structure including a transparent base plate 21, a transparent electrode layer 22, and a photo-modulation layer 23. The base plate 21 functions as a support for the electrode layer 22 and the photo-modulation layer 23. The electrode layer 22 is sandwiched between the base plate 21 and the photo-modulation layer 23. The photo-modulation layer 23 has an electrooptic effect.

During a reading process, the photo-modulation layer 23 of the reading head RH is opposed closely to the charge holding layer IL of the recording medium RM. The distance between the photo-modulation layer 23 of the reading head RH and the charge holding layer IL of the recording medium RM is maintained with a predetermined small value. The electrode layer 22 of the reading head RH and the electrode layer E of the recording medium RM are electrically grounded.

A polarized reading light beam RL of a small section is generated by the combination of a laser (not shown)

and a polarizer (not shown). The reading light beam RL successively passes through the base plate 21, the electrode layer 22, and the photo-modulation layer 23 of the reading head RH, and then successively passes through the charge holding layer IL, the electrode layer E, and the base plate BP of the recording medium RM. After the reading light beam RL exits from the recording medium RM, the reading light beam RL is incident to a photo-to-electrical transducer (not shown) via an analyzer (not shown).

The photo-modulation layer 23 of the reading head RH is exposed to an electric field generated in correspondence with a charge latent image formed on the charge holding layer IL of the recording medium RM. While the reading light beam RL passes through the photo-modulation layer 23 of the reading head RH, the electrooptic effect by the photo-modulation layer 23 causes the polarization of the reading light beam RL to be modulated in accordance with the electric field applied to the photo-modulation layer 23. Thus, the polarization of the reading light beam RL outputted from the reading head RH is modulated in accordance with the charge latent image on the charge holding layer IL of the recording medium RM. The combination of the analyzer and the photo-to-electric transducer detects the polar modulation of the reading light beam RL and transform it to an electric signal representing the charge latent image.

The photo-modulation layer 23 of the reading head RH is composed of a complex film of high polymer material and liquid crystal material. In the complex film, the liquid crystal is dispersed or impregnated in the high polymer material. It is preferable that the high polymer material has a volume resistivity of $10^{14}\Omega$ cm or higher. The high polymer material is transparent or semitransparent. The high polymer material is selected from various substances such as methacrylic resin, polyester resin, polycarbonate resin, vinyl chloride resin, polyamide resin, polyethylene resin, polypropylene resin, polystyrene resin, and silicone resin. The liquid crystal is selected from various substances such as nematic liquid crystal which assume a phase exhibiting characters of liquid crystal at a room temperature.

One example of the reading head RH was fabricated as follows. As the liquid crystal material to be dispersed in the high polymer material, 3 grams of nematic liquid crystal "E-44" produced by British company, BHD limited, was prepared. A predetermined amount of chloroform solution containing 10% polymethyl methacrylate (PMMA) was prepared. The liquid crystal was added to the solution, and the solution with the liquid crystal was agitated to enable the liquid crystal to be well dispersed in the solution. Then, the solution containing the PMMA and the liquid crystal was kept stationary for some period of time.

A glass plate for the base plate 21 was prepared. A film of indium tin oxide (ITO) was formed on a surface of the glass plate 21 in a suitable way. The ITO film constitutes the electrode layer 22. The glass plate with the ITO film was cleaned. The solution containing the PMMA and the liquid crystal was applied by a bar coater to the surface of the ITO film to form a composite film of the high polymer material and the liquid crystal on the ITO film. The composite film constitutes the photo-modulation layer 23.

The composite film of the high polymer material and the liquid crystal enables a small thickness of the photo-modulation layer 23 so that the photo-modulation layer 23 can be positioned adequately close to the recording medium RM. Thus, the photo-modulation layer 23 can be exposed to an adequately strong electric field caused by a charge latent image on the recording medium RM, and the charge latent image can be detected accurately.

In order to obtain a high contrast image in the present invention, a liquid crystal material having its refraction anisotropy $\Delta n$ higher than 0.18 is preferred to be used where the refraction anisotropy $\Delta n$ is defined as:

$$\Delta n = ne - no$$

where ne denotes the extraordinary index and no denotes ordinary index of the liquid crystal material.

In this regard, in addition to the type "E-44", E-7, 8, 18, 37, 38, 43, 45–49, 63 of the BHD limited are also preferably liquid crystal materials which render a high polarization characteristic when dispersed in the high polymer material in the present invention.

On the other hand, a liquid crystal material having its droplet size less than 0.5 micron when dispersed in the high polymer material or having network structure, is preferable to obtain a high resolution image.

The PMMA having its refractive index n in the range 1.49 to 1.54 exhibited a desired high contrast image in the previously mentioned example, but a PET having its refractive index n of 1.65 exhibited a poor contrast image. From those results, it is considered that the preferable refractive index of the high polymer material to be used is equal to or less than the ordinary ray refractive index of the liquid crystal material to be dispersed therein.

DESCRIPTION OF THE SECOND PREFERRED EMBODIMENT

Figure 3:
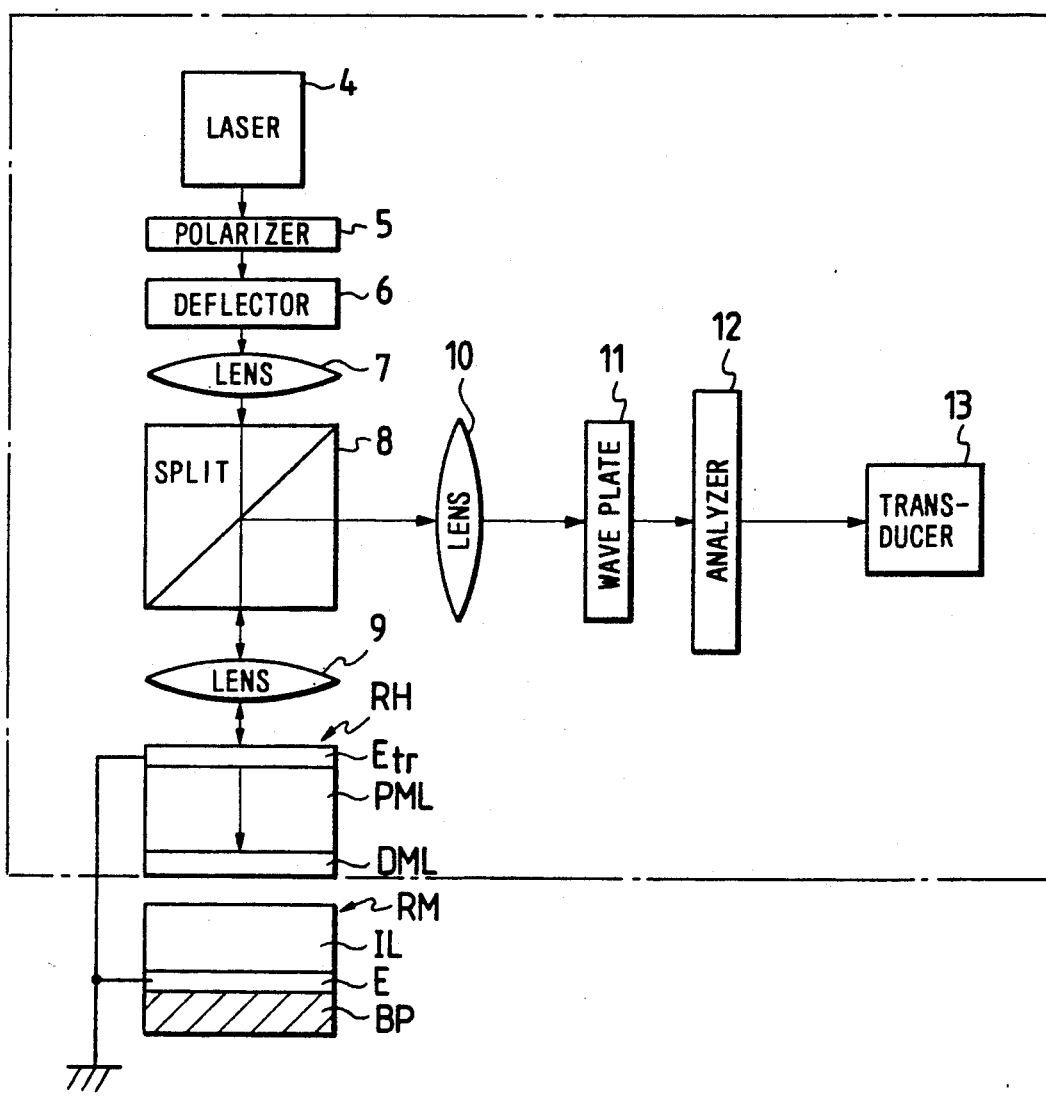
FIG. 3 is a diagram of a charge latent image detecting device according to a second embodiment of this invention.

With reference to FIG. 3, a reading system includes a laser 4 emitting a beam of light which passes through a polarizer 5. The polarizer 5 converts the laser light beam into a linearly polarized light beam. After the light beam exits from the polarizer 5, the light beam is incident to an optical deflector 6. The optical deflector 6 functions to deflect the light beam in a form of two-dimensional scanning pattern.

The light beam outputted from the optical deflector 6 enters a collimator lens 7. During the process of deflecting the light beam by the optical deflector 6, the collimator lens 7 directs the deflected light beam along parallel straight paths.

The light beam outputted from the collimator lens 7 is incident to a beam splitter 8. The incident light beam passes through the beam splitter 8 and then enters a lens 9. The lens 9 converges the light beam on a reading head RH.

The reading head RH has a laminated structure including a transparent electrode layer Etr, a photo-modulation layer PML, and a dielectric mirror layer DML. The photo-modulation layer PML has an electrooptic effect. The photo-modulation layer PML is sandwiched between the electrode layer Etr and the dielectric mirror layer DML. The electrode layer Etr opposes the lens 9 while the dielectric mirror layer DML opposes a recording medium RM. The electrode layer Etr is electrically grounded.

The recording medium RM has a laminated structure including a charge holding layer IL, an electrode layer E, and a base plate BP as in the embodiment of FIGS. 1 and 2. The charge holding layer IL is opposed to the dielectric mirror layer DML of the reading head RH.

The electrode layer E is electrically grounded. A charge latent image is previously formed on the recording medium RM as in the embodiment of FIGS. 1 and 2.

After the light beam exits from the lens 9, the light beam enters the photo-modulation layer PML via the electrode layer Etr. The light beam passes through the photo-modulation layer PML and reaches the dielectric mirror layer DML. Then, the light beam is reflected by the dielectric mirror layer DML and travels back through the photo-modulation layer PML and the electrode layer Etr. After the reflected light beam exits from the electrode layer Etr, the reflected light beam reenters the beam splitter 8 via the lens 9.

The photo-modulation layer PML of the reading head RH is exposed to an electric field correspondingly generated by the charge latent image formed on the charge holding layer IL of the recording medium RM. While the light beam passes back and forth through the photo-modulation layer PML of the reading head RH, the electrooptic effect of the photo-modulation layer PML causes the polarization of the light beam to be modulated in accordance with the two dimensionally distributed electric field over the photo-modulation layer PML. Thus, the polarization of the reflected light beam outputted from the reading head RH is modulated in accordance with the charge latent image on the charge holding layer IL of the recording medium RM.

The light beam outputted from the lens 9 is reflected by the beam splitter 8 toward a lens 10. After the light beam reaches the lens 10, the light beam is converged by the lens 10 on a photo-to-electric transducer 13 and is detected by the transducer 13. A wave plate 11 and an analyzer 12 are disposed in a light path between the lens 10 and the photo-to-electric transducer 13. The wave plate 11 functions to provide an optical bias to the light beam. The analyzer 12 transforms the polar-modulated light beam pattern to intensity-modulated pattern to be detected by the transducer 13. The photo-to-electric transducer 13 generates an electric signal which depends on the intensity of the light beam incident to the transducer 13. Since the polarization of the light beam incident to the analyzer 12 is varied in accordance with the charge latent image on the charge holding layer IL of the recording medium RM, the electric signal generated by the photo-to-electric transducer 13 represents the charge latent image. The scanning process realized by the optical deflector 6 enables the electric signal to represent two-dimensional information of the charge latent image in a time domain.

The photo-modulation layer PML is composed of a composite film of high polymer material and liquid crystal similarly to the photo-modulation layer 23 in the embodiment of FIGS. 1 and 2.

What is claimed is:

1. A device for detecting a charge latent image on a recording medium, comprising:
    a photo-modulation member having an electrooptic effect, the photo-modulation member opposing the recording medium and being exposed to an electric field generated by the charge latent image;
    means for applying a polarized light to the photo-modulation member, wherein the polarized light enters the photo-modulation member, and passes through the photo-modulation member and then exits from the photo-modulation member;
    means for detecting a polarization of the light which exits from the photo-modulation member;
    wherein the electrooptic effect of the photo-modulation member modulates a polarization of the light in accordance with the electric field applied to the photo-modulation member while the light passes through the photo-modulation member;
    wherein the photo-modulation member is composed of a composite film which comprises a high polymer material and a liquid crystal material dispersed in the high polymer material.

2. The device of claim 1 wherein the high polymer material comprises a resin which is selected from the group consisting of methacrylic resin, polyester resin, polycarbonate resin, vinyl chloride resin, polyamide resin, polyethylene resin, polypropylene resin, polystyrene resin, and silicone resin.

3. The device of claim 1 wherein the liquid crystal material comprises nematic liquid crystal.

4. A device for detecting a charge latent image on a recording medium, comprising:
    a photo-modulation member having an electrooptic effect, the photo-modulation member opposing the recording medium and being exposed to an electric field generated by the charge latent image;
    means for applying light to the photo-modulation member, wherein the light enters the photo-modulation member, and passes through the photo-modulation member and then exits from the photo-modulation member;
    means for detecting a polarization of the light which exits from the photo-modulation member;
    wherein the electrooptic effect of the photo-modulation member modulates a polarization of the light in accordance with the electric field applied to the photo-modulation member while the light passes through the photo-modulation member;
    wherein the photo-modulation member is composed of a composite film which comprises a high polymer material and a liquid crystal material dispersed in the high polymer material.

5. The device of claim 4 wherein the high polymer material comprises a resin which is selected from the group consisting of a methacrylic resin, a polyester resin, a polycarbonate resin, a vinyl chloride resin, a polyamide resin, a polyethylene resin, a polypropylene resin, a polystyrene resin and a silicone resin.

6. The device of claim 4 wherein the liquid crystal material comprises nematic liquid crystal.

* * * * *